Figure 5:
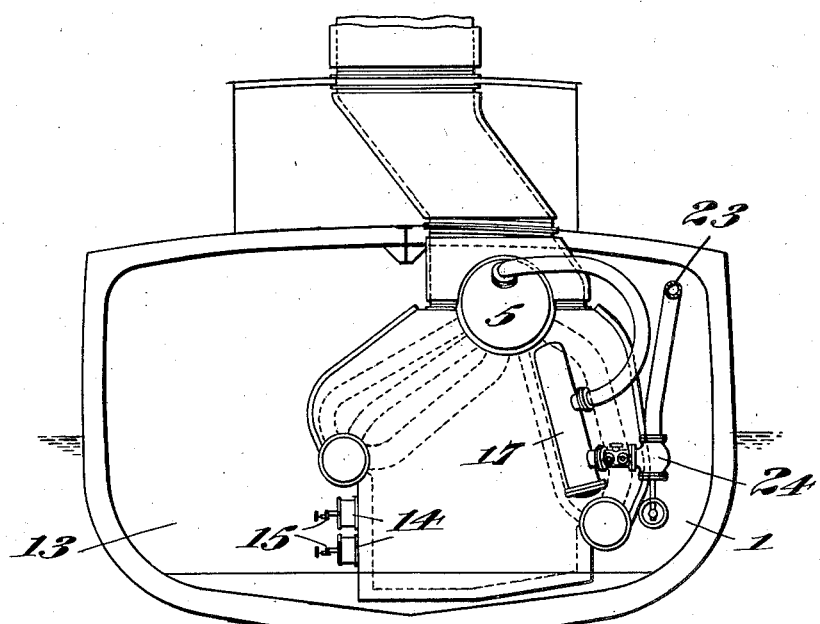

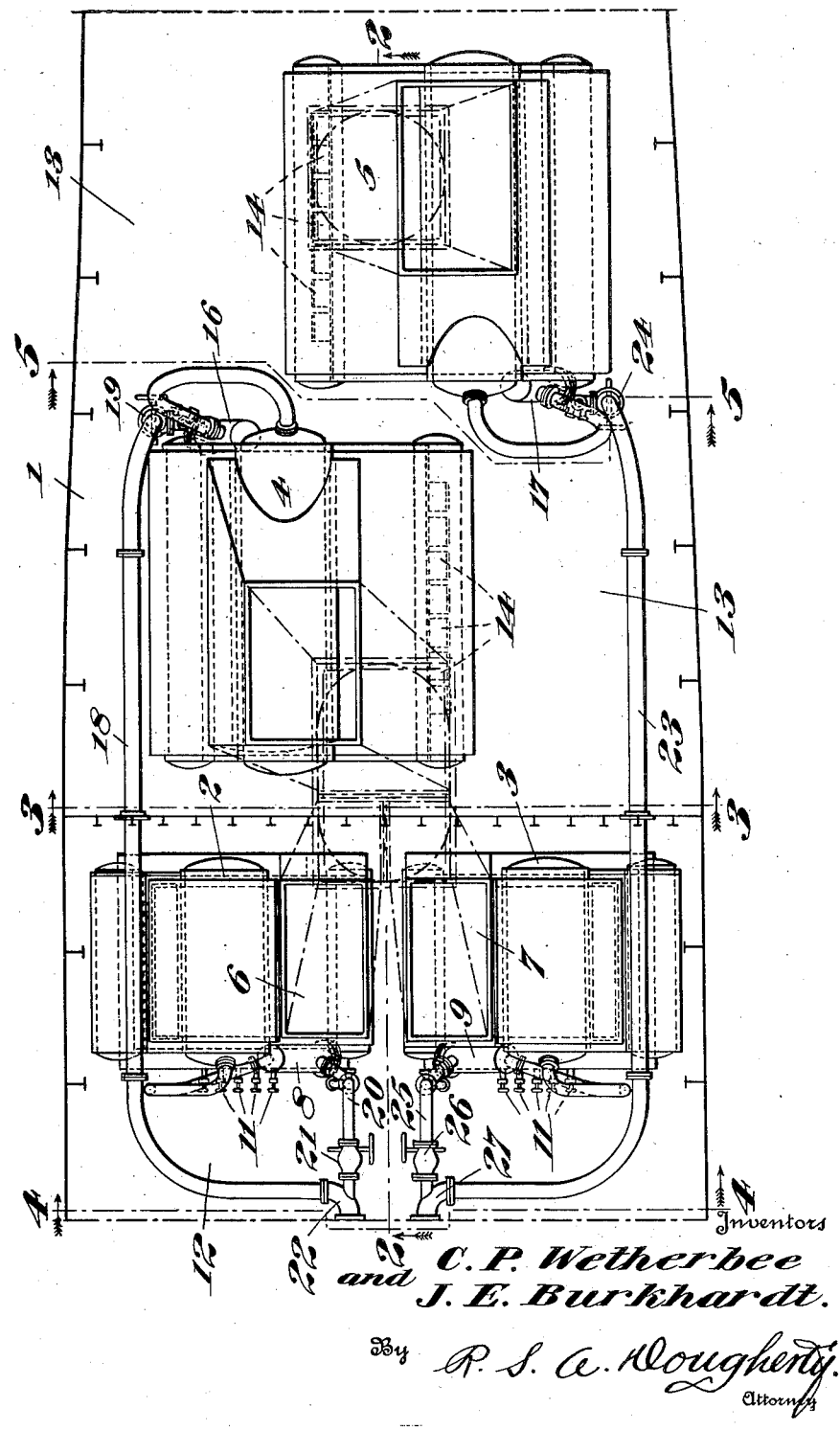

Sept. 11, 1934. C. P. WETHERBEE ET AL 1,973,399
BOILER ROOM INSTALLATION FOR SHIPS
Filed Dec. 11, 1931 4 Sheets-Sheet 2
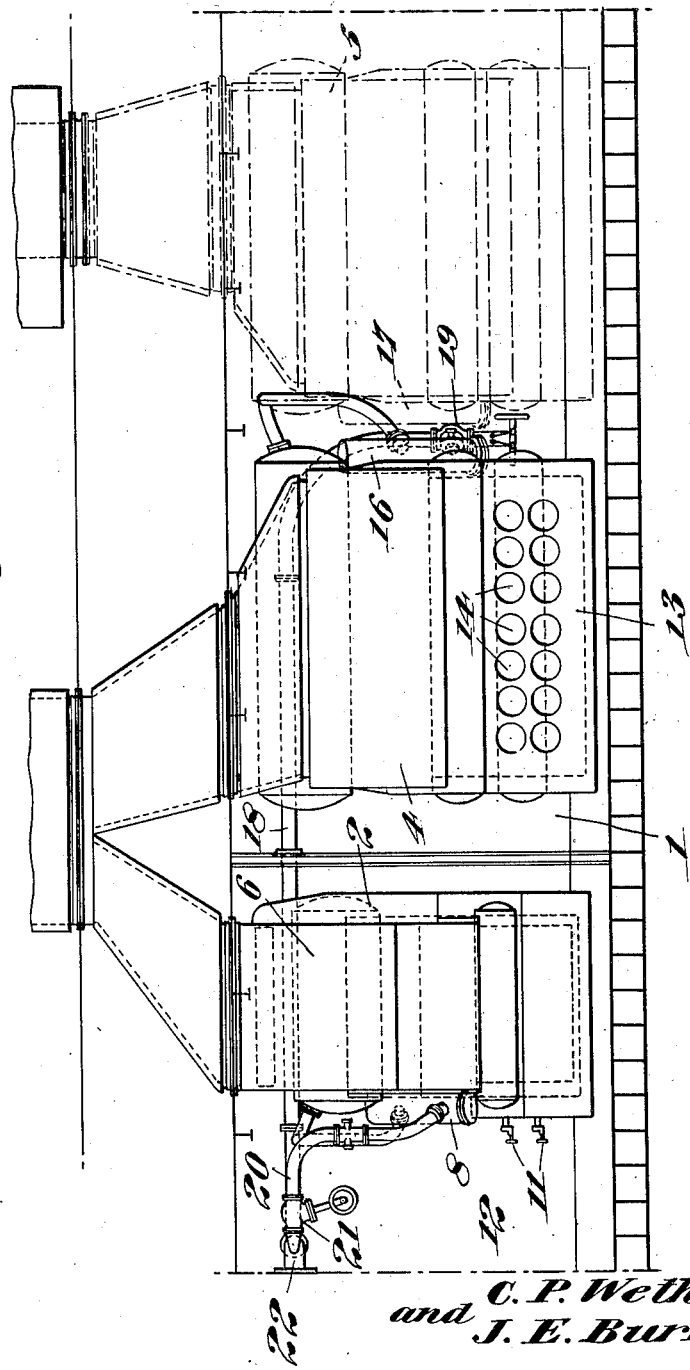
Inventors
C. P. Wetherbee
and J. E. Burkhardt.
By R. S. A. Dougherty
Attorney

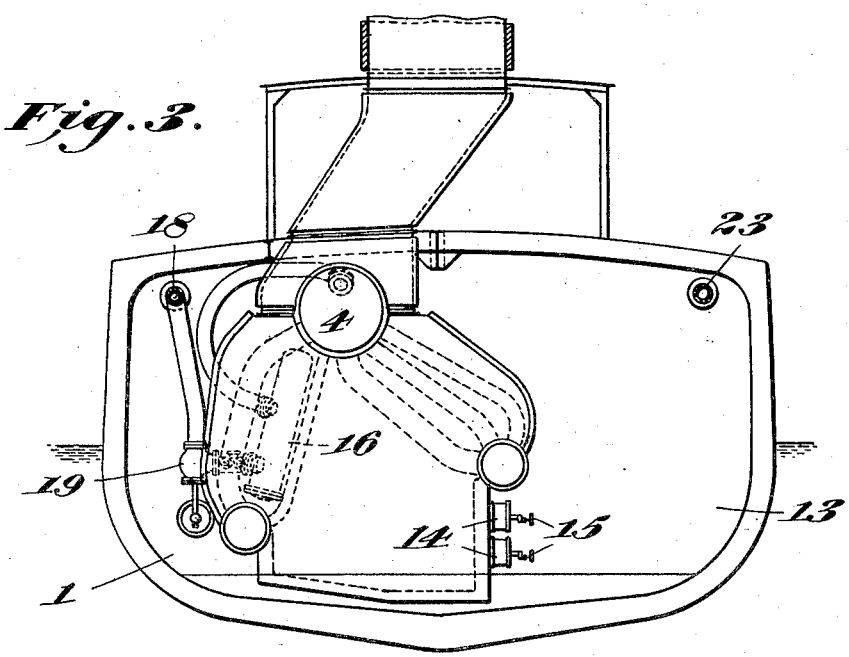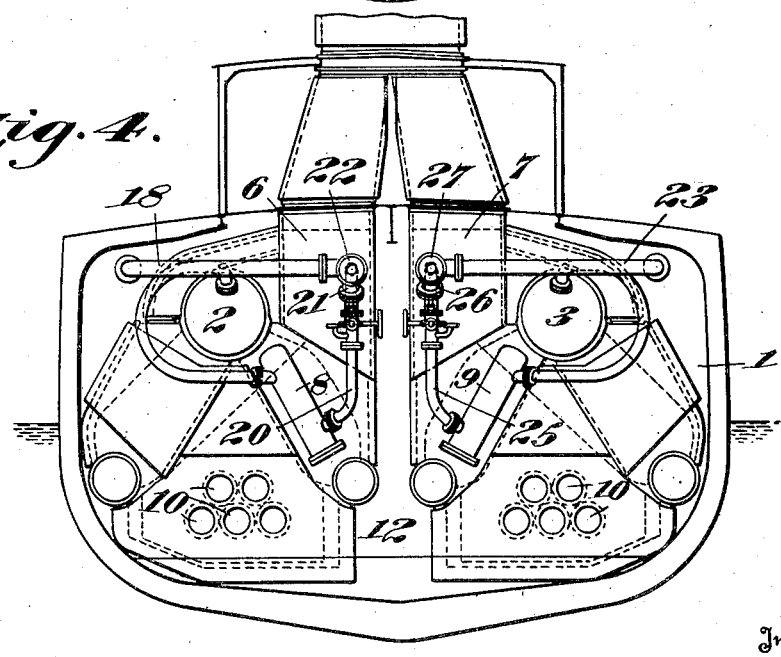

Sept. 11, 1934.  C. P. WETHERBEE ET AL  1,973,399
BOILER ROOM INSTALLATION FOR SHIPS
Filed Dec. 11, 1931    4 Sheets-Sheet 4

Inventors
C. P. Wetherbee
and J. E. Burkhardt.
By R. S. A. Dougherty.
Attorney

Patented Sept. 11, 1934

1,973,399

UNITED STATES PATENT OFFICE 1,973,399

BOILER ROOM INSTALLATION FOR SHIPS

Charles P. Wetherbee, Bath, Maine, and John E. Burkhardt, Quincy, Mass., assignors to Bethlehem Shipbuilding Corporation, Ltd., a corporation of Delaware Application December 11, 1931, Serial No. 580,320

15 Claims. (Cl. 114—.5)

Our invention relates to steam power plants and more especially to the arrangement or layout of a boiler room installation adapted for use on ships of the destroyer type or vessels of similar construction in which widely different ranges of steam power outputs for driving speeds are required.

One of the objects of our invention is to so arrange and combine a plurality of boilers different in output capacity in such a manner that there is obtained a maximum of boiler output in a minimum of available space.

Another object of our invention is to provide as applied to ships of the destroyer type and the like, a power plant having a boiler unit of small capacity and high efficiency sufficient for the usual normal requirements, and supplementary boiler units of large capacity and less efficiency for the exceptional special requirements, whereby weight and space is saved as compared with previous installations.

Another object of our invention relates to the arrangement of the boilers whereby an individual fire room space is provided for each boiler to give operating convenience.

Another object of our invention is to obtain greater economy of operation.

In driving ships of the destroyer type at maximum speed when in active service, as in times of war, an extremely high output of horse power is required; when cruising, however, which they are doing about nine tenths of the time, only a comparatively small output of horse power is necessary.

Heretofore the plurality of boilers comprising that part of the power plant for a destroyer were placed in longitudinal alignment either in a single row or in a double row. While there is at the present time a demand for increased speed in destroyers there is a tendency not to materially increase the size of the ship. Consequently for the most approved needs the present size of ships is too small for a double row, when using boilers of uniform size and uniform efficiency; and furthermore, a single row is prohibitive on account of the amount of lengthwise space required.

Efficiency as herein intended is that as usually applied to the combination of the boiler, furnace, and grate, and is expressed by the following formula:

$$\text{Efficiency of boiler, furnace, and grate} = \frac{\text{Heat absorbed by boiler per pound of fuel fired}}{\text{Heat of perfect combustion per pound of fuel}}$$

In order to obtain a high efficiency in boilers to a maximum degree, it becomes necessary to utilize structure that tends to add weight and to occupy additional space. In the applicants' invention the problem was to meet general operation economy over the greater proportion of operating time and at the same time provide power capacity sufficient for exceptional high speed requirements. This was met by the applicants by selection of the most economical type of boiler for the small capacity large time requirement, although here it meant certain additional weight and space to obtain the same, and for the large capacity small time requirement economy of operation was subordinated to capacity with weight and space reductions in order to obtain the maximum of speed. Economy of operation is gained through the addition of air preheaters, super-heaters, and the like, which add weight and occupy space and which if added to the large capacity boilers would have a prohibitive effect on the speed requirements. Further invention lies in the possible economical arrangement of these specific boilers in the limited space available.

Although a plurality of boilers two abreast has been used it has not been considered a satisfactory design for the reason that the boiler room becomes too congested.

In a certain specific design for a destroyer we have found by arranging two small high efficiency boilers abreast together with two large boilers of less efficiency arranged in staggered relation to each other lengthwise of the ship, that a very satisfactory result is obtained both in economy of space and in operation. These small boilers are of the most efficient type available and adaptable for the purpose, being equipped with superheaters and air preheaters.

In this specific instance the maximum boiler capacity is approximately 47,000 H. P. and this is sufficient to drive the ship at a maximum speed of 36½ knots per hour. Of this total capacity each one of the small boilers has a maximum capacity of approximately 6,000 H. P.

The small boilers are used during what is known as the cruising range, which may be stated as averaging twelve knots per hour and requiring approximately 1,000 H. P. boiler output. As the cruising range represents approximately that service upon which the destroyer is engaged about nine tenths of the time it is apparent that one small boiler operating at a reduced rate is ample to take care of the normal requirements, and this at a high rate of efficiency not obtainable in previous practice. At increased speeds approaching 20 knots per hour the second small boiler is thrown in with the same economy of operation. At speeds ranging from 25 knots to the maximum of 36½ knots one or both of the large boilers are put into operation. The need for these higher speeds is exceptional and the boiler capacity required to attain them is large, therefore it has been deemed more desirable to have this added capacity economical of space rather than economical of operation. The combination of two small boilers of high efficiency together with the two large boilers of less efficiency averaged as herein stated has resulted in permanent economy of space and in an unusual economy during most of the time the ship is in service.

In case of accident to the small boilers, or when requiring repairs, one of the large boilers can be used until repairs are made. The boilers are interconnected so that they may be used in combination or singly.

Having thus given a general description of our invention, we will now in order to make the same more clear refer to the annexed four sheets of drawings in which like characters of reference indicate like parts.

Figure 1 is a top plan view showing diagrammatically the boiler room of a portion of a ship with the boilers arranged in accordance with our invention;

Fig. 2 is a vertical longitudinal sectional elevation taken substantially on the line 2—2 of Fig. 1 and indicating the position of the forward large boiler in dot and dash lines; and, Figs. 3, 4, and 5 are vertical transverse sections taken respectively on the lines 3—3, 4—4 and 5—5 of Fig. 1.

Figure 6:
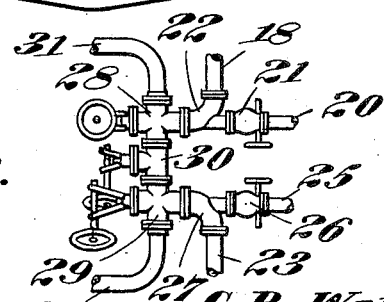

Fig. 6 is a fragmentary detail of piping and valves shown in Fig. 4.

Referring to the drawings the numeral 1, indicates the boiler room of a ship of the destroyer type having a pair of small boilers 2 and 3 disposed abreast transverse of the boiler room 1, and, 4 and 5 a pair of large boilers placed in staggered relation to each other in front of the small boilers and longitudinally therewith. Each of the small boilers 2 and 3 are of the high efficiency type having air preheaters 6 and 7 and superheaters 8 and 9, each of said boilers having burner openings 10 at the front ends with burners 11 by means of which the boilers can be longitudinally fired and controlled in the fire room 12. The large boilers have burner openings 14 for the burners 15 which are controlled in the fire rooms 13.

This arrangement gives cross-firing of the large boilers 4 and 5 which in connection with the staggered relation of placement gives the large fire rooms 13. As may be noted in Figs. 3 and 5 the boilers 4 and 5 are "right" and "left" as regards their location. This disposes their weights in balanced relation to the center line of the ship.

It will be seen that the large boilers 4 and 5 are each provided with a superheater 16 and 17 respectively, but that air preheaters are not used. While air preheaters could be used to increase the efficiency comparable with that obtained in the smaller boilers, their addition would vastly increase the weight and initial cost of construction of the high power boilers. In view of the fact that these boilers are so little in use efficiency has been sacrificed in order to save weight and space occupied by the boilers and thus provide fire rooms of a size which would otherwise be impracticable to obtain were the more efficient large boilers used. The purpose being to operate the ship economically most of the time, but have available high boiler power when conditions demand.

A pipe 18 having a controlling valve 19 is connected to the lower end of the superheater 16 of the large boiler 4 and extends rearwardly therefrom to the coupling 22. A pipe 20 having a controlling valve 21 extends from the lower end of the superheater 8 of the small boiler 2 and is a connected to the coupling 22.

The large boiler 5 is connected in a similar manner to the lower end of the superheater 17 by means of a pipe 23 having a controlling valve 24 and extends rearwardly to the coupling 27. A pipe 25 having a valve 26 extends from the lower end of the superheater 9 of the small boiler 3 and is connected to the coupling 27.

The couplings 22 and 27 are connected to valves 28 and 29. These valves 28 and 29 are connected together by means of a valve 30, by these means the flow of fluid pressure from the boilers may be conducted through either one of or both of the pipes 31 and 32 to the engines.

By manipulating the controlling valves 19, 21, 24, 26, 28, 29, and 30, any single one or combination of the boilers may be placed in operation as desired.

In the drawings we have illustrated well known standard types of marine boilers but it will be understood that we do not claim the boilers as any other standard marine boilers arranged and equipped in a similar manner could be used if desired.

Although we have described and illustrated our invention as specifically applied to a combination of two large boilers and two small boilers, we do not wish to be limited to the exact and specific details thereof, as shown and described, but may use such modifications in, substitutions for, or equivalents thereof, as are embraced within the scope of our invention, or as pointed out in the claims.

Having thus described our invention what we claim as new and desire to secure by Letters Patent is:

1. A boiler room installation for ships or the like, comprising, a plurality of small boilers of high efficiency disposed transversely of the ship with respect to one another and the fire boxes of said boilers disposed in a direction longitudinally of the ship, and a plurality of large boilers of less efficiency disposed longitudinally of the ship with respect to one another and with the fire boxes of the second mentioned boilers disposed in a direction transversely of the ship.

2. A boiler room installation for a ship or the like, comprising a plurality of boilers disposed transversely of the ship, and a plurality of boilers disposed in staggered relation to each other longitudinally of the ship.

3. A boiler room installation for a ship or the like, comprising a plurality of small boilers disposed transversely of the ship, and a plurality of relatively large boilers disposed in staggered relation to each other and in longitudinal alignment with the relatively small boilers.

4. A boiler room installation for a ship or the like, comprising a pair of small boilers of high efficiency disposed transversely of the ship, means for longitudinally firing the pair of small boilers, a pair of large boilers placed in staggered relation to each other longitudinally of the ship, and means for transversely firing the large boilers.

5. A boiler room installation for a ship or the like, comprising a plurality of boilers of high efficiency disposed transversely of the ship, a plurality of boilers of less efficiency disposed in staggered relation to each other longitudinally of the ship, a fluid pressure connection between the boilers, and means for controlling the supply of fluid pressure from the boilers.

6. A boiler room installation for a ship or the like, comprising a high efficiency boiler adapted to be longitudinally fired, a boiler of less efficiency adapted to be cross fired, a fluid pressure connection between the boilers, and means for individually and collectively controlling the output from said boilers.

7. A boiler room installation for a ship or the like, comprising a plurality of boilers of high efficiency disposed transversely of the ship, a plurality of boilers of less efficiency disposed in staggered relation to each other longitudinally of the ship, and fluid pressure connections between each of the boilers of high and less efficiency.

8. A boiler room installation for a ship or the like, comprising a plurality of small boilers of high efficiency disposed transversely of the ship, a plurality of large boilers of less efficiency disposed in staggered relation to each other longitudinally of the ship, a fluid connection between the small and large boilers, and means for controlling the supply of fluid pressure from the boilers.

9. A boiler room installation for a ship or the like, comprising a plurality of relatively small boilers of high efficiency disposed transversely of the ship, and a plurality of relatively large boilers of less efficiency disposed in staggered relation to each other longitudinally of the ship, and means for individually or collectively controlling the supply of fluid pressure from the boilers.

10. A boiler room installation for a ship or the like, comprising a small longitudinally fired boiler of high efficiency and a transversely fired large boiler of less efficiency disposed near each side of the boiler room, a fluid pressure connection between each one of the small and large boilers, a fluid pressure connection between all of the boilers, and means for controlling the supply of fluid pressure from all of the boilers.

11. A boiler room installation for a ship or the like, comprising a pair of small boilers of high efficiency, a transverse fire room at the ends of the small boilers, a pair of relatively large boilers of less efficiency disposed in staggered relation to each other and in longitudinal alignment with the small boilers and a longitudinal fire room at one side of each of the large boilers.

12. A boiler room installation for a ship or the like, comprising a pair of relatively small boilers of high efficiency, a pair of relatively large boilers of less efficiency disposed in staggered relation to each other and in longitudinal alignment with the relatively small boilers, a fluid pressure connection between each one of the small boilers and the large boilers, means for controlling the output from each of the boilers, and means for controlling the output from all of the boilers.

13. A boiler room installation for a ship or the like, comprising a pair of relatively small boilers of high efficiency disposed transversely of the ship, a pair of relatively large boilers of less efficiency disposed in staggered relation to each other and in longitudinal alignment with the relatively small boilers, a pipe connecting each of the small boilers with one of the large boilers, means for connecting the two pipes together, individual means for controlling the supply of fluid pressure from each boiler, and means for controlling the output from all of the boilers.

14. A boiler room installation for a ship or the like, comprising a pair of small boilers of high efficiency disposed transversely of the ship, a transverse fire room extending across one end of both of the small boilers, a pair of relatively large boilers of less efficiency disposed in staggered relation to each other and in longitudinal alignment with the small boilers, a longitudinal fire room at one side of each of the large boilers, said longitudinal fire room being on opposite sides of the boilers in staggered relation to each other.

15. A boiler room installation for a ship or the like, comprising a pair of small boilers of high efficiency having air preheaters and superheaters, a transverse fire room extending across one end of both of the small boilers, a pair of relatively large boilers of less efficiency having superheaters only, said large boilers being disposed in staggered relation to each other and in longitudinal alignment with the small boilers, a fire room extending longitudinally at one side of each of the large boilers, the fire room for one of the large boilers being on the opposite side to that of the fire room for the other large boiler and in staggered relation thereto, fluid pressure connections between the boilers, and means for controlling the fluid pressure output from the boilers.

CHARLES P. WETHERBEE.
JOHN E. BURKHARDT.